United States Patent [19]

Inoue et al.

[11] Patent Number: 4,721,766

[45] Date of Patent: Jan. 26, 1988

[54] ROOM TEMPERATURE-CURABLE ORGANOPOLYSILOXANE COMPOSITION

[75] Inventors: Yoshio Inoue; Masatoshi Arai, both of Annaka; Koji Yokoo, Tomioka, all of Japan

[73] Assignee: Shin-Etsu Chemical Co., Ltd., Tokyo, Japan

[21] Appl. No.: 894,857

[22] Filed: Aug. 8, 1986

[30] Foreign Application Priority Data

Aug. 16, 1985 [JP]  Japan ................................. 60-180346

[51] Int. Cl.[4] ............................................... C08G 77/06
[52] U.S. Cl. ........................................ 528/18; 528/33; 528/34; 528/901; 524/588; 524/730; 524/765
[58] Field of Search .................... 528/33, 34, 901, 18; 524/588, 730, 765

[56] References Cited

U.S. PATENT DOCUMENTS

| 4,180,642 | 12/1979 | Takago | 528/34 |
| 4,417,042 | 11/1983 | Dziark | 528/34 |
| 4,579,963 | 4/1986 | Arai et al. | 528/34 |

*Primary Examiner*—Melvyn I. Marquis
*Attorney, Agent, or Firm*—Hopgood, Calimafde, Kalil, Blaustein & Judlowe

[57] ABSTRACT

The room temperature-curable organopolysiloxane composition of the invention is imparted with greatly improved stability in prolonged storage without being affected in respect of the curability. The composition is formulated, in addition to the base ingredients of a silanol- or alkoxy-terminated diorganopolysiloxane and a filler, with an alkenyloxy-containing silane compound in an amount of at least equimolar to the silanol groups and water in the base ingredients and a guanidino-containing organosilane compound in a limited amount.

3 Claims, No Drawings

ROOM TEMPERATURE-CURABLE ORGANOPOLYSILOXANE COMPOSITION

BACKGROUND OF THE INVENTION

The present invention relates to a room temperature-curable organopolysiloxane composition or, more particularly, to a room temperature-curable organopolysiloxane composition curable by the dealcoholation reaction for crosslinking and having excellent stability in storage over a long period of time.

Various types of room temperature-curable organopolysiloxane compositions are known and widely used in applications, of which the dealcoholation type compositions are advantageously used in electric and electronic industries due to the absence of corrosive ingredients and emission of irritant gases because the room temperature-curable organopolysiloxane composition of this type is formulated with a diorganopolysiloxane terminated at both molecular chain ends each with a silanolic hydroxy group as the main ingredient together with an alkoxysilane compound, e.g. methyl trimethoxy silane, as the crosslinking agent and a catalyst compound such as organic titanium compounds and organic titanium-containing chelate compounds so that the crosslinking reaction therein to give a rubbery cured material proceeds by the condensation reaction between the silanol groups and the alkoxy groups to produce an alcoholic compound as the condensation product.

On the contrary to the above mentioned advantages, the dealcoholation type room temperature-curable organopolysiloxane composition, referred to as a RTV composition hereinafter, has several problems and disadvantages. For example, the velocity of curing thereof is relatively low, especially, in the core portion of a thick body and the stability of the composition in storage is poor eventually to cause troubles in use relative to the curability.

Several proposals and attempts have been made in order to improve the dealcoholation type RTV composition in this regard including a method of admixing the composition with a silane compound having two alkoxy groups as a so-called "silane scavenger" to improve the storage stability and curability. This method, however, is disadvantageous because such a special silane compound must be prepared separately for this particular purpose and, while the silane compound has other highly reactive hydrolyzable groups than the alkoxy groups such as amido and amino groups to cause corrosiveness or unpleasant odor, silane compounds having these groups cannot be used as an adhesive in electric and electronic industries.

SUMMARY OF THE INVENTION

Accordingly, the present invention has an object to provide a RTV composition of the dealcoholation type free from the above described problems and disadvantages in the prior art compositions of the same type and the RTV composition provided by the present invention comprises:

(a) 100 parts by weight of a diorganololysiloxane terminated at both molecular chain ends each with a silyl group having a silanolic hydroxy group or two alkoxy groups;

(b) from 1 to 400 parts by weight of a filler;

(c) an organosilane compound represented by the general formula $$R^1{}_nSiX_{4-n},\quad (I)$$

in which $R^1$ is a monovalent halogen-substituted or unsubstituted hydrocarbon group selected from the class consisting of methyl, ethyl, propyl, vinyl, phenyl and 3,3,3-trifluoropropyl groups, X is an alkenyloxy group represented by the general formula $$-O-C(=CH-R^2)(-CH_2-R^2),\quad (II)$$

each $R^2$ being a hydrogen atom or an alkyl group selected from the class consisting of methyl, ethyl and propyl groups, and n is zero or 1, or a partial hydrolysis product thereof in an at least equimolar amount to the overall content of the silanolic hydroxy groups in the component (a) and the moisture contained in the component (b);

(d) from 0.01 to 10 parts by weight of an organosilane or organopolysiloxane compound having, in a molecule, at least one guanidino group represented by the general formula $$(R^3{}_2N)_2C=N-,\quad (III)$$

in which $R^3$ is a hydrogen atom or a monovalent hydrocarbon group; and (e) an organic tin compound in an amount in the range from 0.01 to 10% by weight based on the total amount of the components (a) to (d).

The composition may optionally further comprise: (f) up to 10% by weight of an alcoholic compound represented by the general formula $$R^4OH,\quad (IV)$$

in which $R^4$ is a monovalent hydrocarbon group; and (g) up to 50% by weight of an alkoxysilane compound represented by the general formula $$R^5{}_mSi(OR^6)_{4-m},\quad (V)$$

in which $R^5$ is a monovalent hydrocarbon group, $R^6$ is an alkyl group or an alkoxy-substituted alkyl group and m is zero or 1, or a partial hydrolysis product thereof, each amount being based on the total amount of the components (a) to (d).

DETAILED DESCRIPTION OF THE PREFERRED EMBODIMENTS

As is understood from the above given summarizing description, the essential components in the inventive RTV composition is the components (a) to (e), of which the component (a) is a diorganopolysiloxane as the principal ingredient, the component (b) is a filler, the component (c) is an alkenyloxy-containing organosilane or organopolysiloxane compound which serves as a crosslinking agent, the component (d) is a guanidino-containing organosilane or organopolysiloxane compound which serves as a curing aid and the component (e) is an organic tin compound as a curing catalyst. This unique combination of the components in the inventive RTV composition has been established on the base of the discovery that the poor storage stability and curability of the conventional RTV compositions of the dealcoholation type are due to the low reactivity of the alkoxy groups in the alkoxysilane compound to be reacted with the terminal silanol groups of the diorganopolysiloxane and the water contained in the filler so that a considerable portion of the silanol groups may remain unreacted while such a disadvantage can be overcome when the crosslinking agent is an alkenyloxy-containing organosilane or organopolysiloxane compound as combined with the guanidino-containing organosilane or organopolysiloxane compound to impart the composition with improved storage stability and curability. This advantageous improvement can be further enhanced when the composition is further admixed with an alcohol as the component (f) and/or the alkoxysilane compound as the component (g).

The component (a) as the principal ingredient in the inventive RTV composition is a diorganopolysiloxane represented by the average unit formula $R_aSiO_{(4-a)/2}$, in which R is a monovalent hydrocarbon group selected from the class consisting of alkyl groups, e.g. methyl, ethyl, propyl, butyl, 2-ethylbutyl and octyl groups, cycloalkyl groups, e.g. cyclopentyl and cyclohexyl groups, alkenyl groups, e.g. vinyl and allyl groups, aryl groups, e.g. phenyl, tolyl, xylyl, naphthyl and diphenyl groups, and aralkyl groups, e.g. benzyl and phenylethyl groups, as well as those substituted groups obtained by replacing a part or all of the hydrogen atoms in the above named hydrocarbon groups with substituent atoms or groups such as halogen atoms and cyano groups as exemplified by chloromethyl, 3,3,3-trifluoropropyl, 2-cyanoethyl and 3-cyanopropyl groups and the subscript a is a positive number in the range from 1.90 to 2.05. The diorganopolysiloxane has a substantially linear molecular structure and each of the silicon atoms at the molecular chain ends should have a hydroxy group or two alkoxy groups directly bonded thereto. The diorganopolysiloxane should have a sufficiently large average molecular weight in order that a cured silicone rubber having good rubbery elasticity and high mechanical strengths can be obtained by curing the RTV composition formulated therewith. In this regard, the diorganopolysiloxane should have a viscosity of at least 25 censtistokes at 25° C. It is optional that the inventive RTV composition is admixed with another diorganopolysiloxane having terminal groups without silanolic hydroxy group or two alkoxy groups although the amount of such a diorganopolysiloxane should be limited not to exceed the diorganopolysiloxane according to the definition for the component (a).

The component (b) in the inventive RTV composition is a filler which may be any of conventionally used ones including finely divided silica flour, fumed and precipitated silica fillers, diatomaceous earth, metal oxides, e.g. iron oxide, zinc oxide and titanium dioxide, which may optionally be surface-treated with an organosilane compound, metal carbonates, e.g. calcium carbonate, magnesium carbonate and zinc carbonate, asbestos, glass wool, carbon black, finely pulverized mica flakes, fused quartz powder, fine powders of synthetic resins, e.g. polystyrene, polyvinyl chloride and polypropylene, and the like.

The amount of the filler as the component (b) in the inventive RTV composition should be in the range from 1 to 400 parts by weight or, preferably, from 5 to 200 parts by weight per 100 parts by weight of the diorganopolysiloxane as the component (a). When the amount of the filler is too small, the RTV composition would not give a cured rubber having sufficiently high mechanical strengths. When the amount of the filler is too large, on the other hand, some disadvantages and troubles are caused in the compounding works for the preparation of the composition due to the excessively high consistency and in the poor mechanical properties of the cured rubber therefrom such as appearance of brittleness.

The component (c) is an organosilicon compound, viz. an organosilane of the general formula (I) or an organopolysiloxane as a partial hydrolysis product thereof, having, in a molecule, at least three alkenyloxy groups represented by the general formula (II) given above. This component is effective as a silylating agent of the silanol groups and/or water contained in the components (a) and (b) so as to improve the storage stability of the RTV composition. In the general formula (I), the symbol $R^1$ denotes a monovalent halogen-substituted or unsubstituted hydrocarbon group selected from the class consisting of methyl, ethyl, propyl, vinyl, phenyl and 3,3,3-trifluoropropyl groups and X denotes an alkenyloxy group represented by the general formula (II) in which each of the groups $R^2$ is, independently from the other, a hydrogen atom or a lower alkyl group including methyl, ethyl and propyl groups. The subscript n is zero or 1 so that the silane compound has at least three alkenyloxy groups of the formula (II) in a molecule.

Exemplary of the silane compound as the component (c) are methyl trivinyloxy silane, methyl tri(isopropenyloxy) silane, vinyl tri(isopropenyloxy) silane, phenyl tri(isopropenyloxy) silane, propyl tri(isopropenyloxy) silane, methyl tri(1-phenylethenyloxy) silane, methyl tri(1-isobutenyloxy) silane, methyl tri(1-methyl-1-propenyloxy) silane, methyl tri(1,4-dimethyl-1,3-pentadienyloxy) silane and the like. Partial hydrolysis products of these alkenyloxy-containing silanes, either singly or as a combination of two kinds or more, can be used as the component (c).

The amount of the alkenyloxy-containing organosilicon compound as the component (c) in the inventive RTV composition should be at least equimolar to the silanolic hydroxy groups and water contained in the components (a) and (b). Preferably, the amount should be in the range from equimolar to twice by moles thereof. This is because the role played by this component is as a silylating agent for the silanol groups and/or the water contained in the composition. When the amount of the component (c) is too small, the RTV composition may suffer gradual increase in the consistency during storage to lose storage stability. Addition of an excessively large amount of this component in the composition, on the other hand, would have no additional advantage rather with an economical disadvantage. The amount of the silanolic hydroxy groups and water in the components (a) and (b) can be determined by dispersing the blend of these components in a suitable organic solvent followed by the Karl-Fischer's titration of the dispersion.

The component (d) in the inventive RTV composition is a guanidino-containing organosilicon compound, i.e. organosilane compound or organopolysiloxane as a partial hydrolysis product thereof, having, in a molecule, at least one guanidino group represented by the general formula (III) given above, in which each of the groups denoted by $R^3$ is, independently from the others, a hydrogen atom or a monovalent hydrocarbon group. The role played by this component is as a catalyst to promote the silylating reaction of the silanol groups and/or water in the composition by the alkenyloxy-containing organosilicon compound as the component (c).

The guanidino group of the formula (III) can be bonded to a silicon atom of the organosilicon compound through a divalent group which is not limitative to a particular kind but preferably is an alkylene or oxyalkylene group.

Exemplary of the guanidino-containing organosilicon compound as the component (d) are those expressed by the following structural formulas, in which the symbols Me and Et denote methyl and ethyl groups, respectively, and the symbols $G^1$, $G^2$, $G^3$ and $G^4$ denote a 1,1,3,3-tetramethylguanidino, 1,3,-diethyl-1-methyl-3-propylguanidino, 1,1-dimethyl-3,3-diethylguanidino and 1,3-dimethyl-1,3-diphenylguanidino groups, respectively:

$G^1CH_2CH_2CH_2$—$Si(OMe)_3$;
$G^1CH_2CH_2CH_2$—$SiMe(OMe)_2$;
$G^1CH_2CH_2CH_2$—$SiMe_2(OMe)$; $G^1CH_2CH_2$—$Si(OEt)_2$—O—$SiMe_3$;
$G^2CH_2CH_2CH_2CH_2$—$Si(-O-CMe=CH_2)_3$;
$G^3CH_2CH_2CH_2$—$SiMe(-O-N=CMeEt)_2$;
$G^4CH_2CH_2$—O—$CH_2CH_2CH_2$—$Si(-NMeEt)_3$;
and

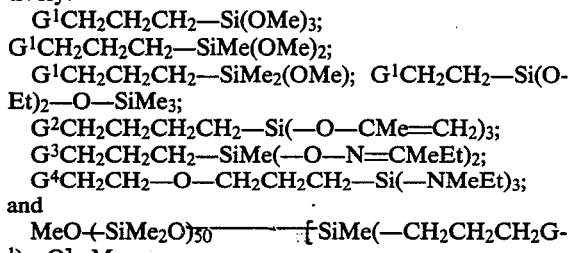

MeO—$(SiMe_2O)_{50}$———$[SiMe(-CH_2CH_2CH_2G^1)-O]_{50}$Me.

Among the above given guanidino-containing organosilane and organopolysiloxane compounds, the most preferable is 3-(1,1,3,3-tetramethylguanidino)propyl trimethoxy silane expressed by the first given structural formula in respect of the easiness in the synthetic preparation.

The amount of the component (d) in the inventive RTV composition should be in the range from 0.01 to 10 parts by weight or, preferably, from 0.1 to 5 parts by weight per 100 parts by weight of the component (a). When the amount thereof is too small, the silylation reaction of the silanol groups and/or water in the components (a) and (b) by the component (c) is promoted only insufficiently so that the reaction can be completed taking an unduly long time consequently to increase the residual amount of the sialnol groups and/or water in the composition so that the composition would have poor storage stability. When the amount thereof is too large, on the other hand, the additional advantegeous effect of promoting the silylating reaction to some further extent is outweighed by the disadvantage of coloration of the RTV composition and the economical disadvantage due to the expensiveness of the compound.

The component (e) is an organic tin compound which may be any of the compounds conventionally used in the RTV compositions as a catalyst to promote the condensation reaction for crosslink formation. Exemplary of such organic tin compounds are carboxylates of tin, e.g. tin naphthenate, tin caprylate and tin oleate, and organotin compounds, e.g. dibutyltin diacetate, dibutyltin dioctoate, dibutyltin dilaurate, dibutyltin dioleate, diphenyltin diacetate, dibutyltin oxide, dibutyltin dimethoxide, bis(triethoxysiloxy) dibutyltin and dibutyltin dibenzylmaleate.

The amount of the organic tin compound as the component (e) in the inventive RTV composition should be in the range from 0.01 to 10 parts by weight or, preferably, from 0.1 to 2 parts by weight per 100 parts by weight of the component (a). When the amount thereof is too small, the curing reaction can be promoted only insufficiently so that an unduly long time is taken for completion of the curing reaction. When the amount thereof is too large, on the other hand, the storage stability of the RTV composition may be somewhat decreased.

The components (f) and (g), i.e. the alcohol and alkoxysilane compound or a partial hydrolysis product thereof, are each an optional additive in the inventive RTV composition. The alcohol as the component (f) is represented by the general formula (IV) and plays a role to convert the residual SiX groups, if any, of the component (c) into alkoxy groups after completion of the silylating reaction of the silanol groups and/or water in the components (a) and (b) by the component (c). The component (g) has an effect to further improve the storage stability of the inventive RTV composition.

The alcoholic compound as the component (f) is represented by the general formula (IV) and may be selected from the class consisting of methyl, ethyl, propyl, butyl, 2-ethylhexyl and n-octyl alcohols as well as lower alkyl ethers of ethyleneglycol, e.g. ethyleneglycol monomethyl ether. The amount of the component (f) should not exceed 10 parts by weight per 100 parts by weight of the component (a). The amount thereof should preferably be in the range from 1 to 1.5 times by moles of the SiX groups in the component (c) in view of the role played by this component to alkoxylate the residual SiX groups as is mentioned above.

The component (g) is an alkoxysilane compound represented by the general formula (V) or a partial hydrolysis product thereof. In the formula (V), the symbol $R^5$ denotes a monovalent halogen-substituted or unsubstituted hydrocarbon group such as methyl, ethyl, propyl, vinyl, phenyl and 3,3,3-trifluoropropyl groups and $R^6$ denotes an alkyl group such as methyl, ethyl, propyl and butyl groups or an alkoxy-substituted alkyl group such as 2-methoxyethyl and 2-ethoxyethyl groups. The subscript m in the formula is zero or 1 so that the compound has at least three alkoxy groups in a molecule. Exemplary of the alkoxysilane compound as the component (g) are methyl trimethoxy silane, vinyl trimethoxy silane, tetraethoxy silane, methyl triethoxy silane, ethyl trimethoxy silane, methyl triisopropoxy silane, phenyl trimethoxy silane, phenyl tri(methoxyethoxy) silane, vinyl tri(methoxyethoxy) silane, tetra(ethoxyethoxy) silane, 3,3,3-trifluoropropyl trimethoxy silane and the like, of which methyl trimethoxy silane, vinyl trimethoxy silane, phenyl trimethoxy silane, methyl tri(methoxyethoxy) silane and vinyl tri(methoxyethoxy) silane are preferred. Partial hydrolysis products of these alkoxysilane compounds, either singly or as a mixture of two kinds or more, can be used as the component (g).

Although this component (g) is optional in the inventive composition, it is preferable that a substantial amount thereof is added in the formulation of the composition. The amount of the component (g) in the inventive RTV composition, however, should not exceed 50 parts by weight per 100 parts by weight of the component (a). When the amount thereof is too large, the RTV composition would give a cured rubber having poor rubbery elasticity in addition to the economical disadvantage.

The RTV composition of the invention can be prepared by uniformly blending the above described components (a) to (e), optionally, together with the components (f) and/or (g). Although the blending order of the individual components is not particularly limitative, it is a convenient way that the components (a) and (b) are first uniformly blended to give a base compound which is then admixed with the components (c) and (d) and then, under a reduced pressure, with the component (e), optionally, together with the components (f) and/or (g) to give a uniform composition. It is further optional that the inventive RTV composition may be admixed, according to need, with various kinds of known additives conventionally added to silicone RTV compositions including thixotropymodifying agents such as polyethyleneglycol and derivatives thereof, pigments, dyes, aging retarders, antioxidants, antistatic agents, flame-retardants such as antimony oxide and chlorinated paraffins, thermal conductivity improvers such as boron nitride and aluminum oxide and so on. Further optional additives include adhesion improvers, so-called carbon-functional silanes having functional groups, e.g. amino, epoxy and mercapto groups, metal salts of carboxylic acids, metal alcoholates and so on. If necessary, the inventive RTV composition may be diluted with or dispersed in an organic solvent such as hydrocarbon solvents, e.g. toluene and petroleum ether, ketones, esters and the like.

The inventive RTV composition is stable over a long period of time when kept in a hermetically sealed condition to exclude atmospheric moisture but is rapidly cured to give a rubbery cured elastomer when exposed to the atmosphere containing moisture. The storability of the composition is improved so much that the curing behavior thereof is little affected even by storage for 6 months or longer. It is of course that the curing reaction of the composition proceeds without emission of any toxic or corrosive gaseous products as a by-product of the condensation reaction not to cause troubles due to the rust appearing on the surface of a metal part in contact with or in the vicinity of the RTV composition under curing. Further, the cured rubber of the inventive RTV composition firmly adheres to the surface of various kinds of materials or, in particular, metals on which the composition has been cured so that the inventive RTV composition is useful as an adhesive used in electric and electronic parts although the applicability of the inventive RTV composition is not limited thereto and the composition can be used as a sealing agent, caulking agent, coating agent, water-repellent, mold-release agent and fabric finishing agent. In the following, the RTV composition of the invention is illustrated in more detail by way of examples, in which the expression of "parts" always refers to "parts by weight" and the values of viscosity are all those obtained by the measurement at 25° C.

EXAMPLE 1.

A base compound was prepared by uniformly blending 88 parts of a dimethylpolysiloxane having a viscosity of 20,000 centipoise and terminated at both molecular chain ends each with a silanolic hydroxy group, 9 parts of a first fumed silica filler having surfaces blocked with trimethylsilyl groups and 3 parts of a second fumed silica filler surface-treated with an oligomeric cyclic dimethylpolysiloxane. The base compound contained silanolic hydroxy groups and water in an overall amount of 0.0102 mole/100 g.

Thereafter, 100 parts of the base compound were admixed, under exclusion of the atmospheric moisture, with 2.5 parts of vinyl tri(isopropenyloxy) silane and 0.5 part of 3-(1,1,3,3-tetramethylguanidino)propyl trimethoxy silane and then, under reduced pressure, with 0.8 part of methyl alcohol, 5 parts of methyl trimethoxy silane and 0.2 part of dibutyltin dimethoxide to give a curable composition. The amount of the vinyl tri(isopropenyloxy) silane corresponded to a molar ratio of 1.09 to the overall amount of the silanolic hydroxy groups and water in the base compound.

The thus prepared RTV composition was shaped by extrusion into a form of sheet having a thickness of 2 mm which was exposed to a moisture-containing atmosphere of 55% relative humidity at 23° C. The surface of the sheet was tack-free within 5 minutes and the sheet was cured by standing in the same atmosphere for 7 days into a rubber sheet of which mechanical properties were measured according to the procedure specified in JIS K 6301 to give the results shown in Table 1. Further, two more cured rubber sheets were prepared in the same manner as above except that the RTV composition had been stored in a hermetically sealed container for 7 days at 70° C. and for 6 months at 23° C. before shaping and curing into the sheets. The surface dryability of the composition to give a tack-free surface was unaffected by these storage tests. The mechanical properties of these two sheets prepared after the storage tests of the RTV composition are shown in Table 1.

TABLE 1

| | Properties of the cured rubber sheet | | |
|---|---|---|---|
| RTV composition | Hardness, JIS | Ultimate elongation, % | Tensile strength, kg/cm$^2$ |
| As prepared | 24 | 400 | 15 |
| After storage for 7 days at 70° C. | 26 | 410 | 17 |
| After storage for 6 months at 23° C. | 25 | 400 | 16 |

EXAMPLES 2 to 6 AND COMPARATIVE EXAMPLES 1 to 3

Eight RTV compositions were prepared each in substantially the same manner as in Example 1 by admixing 100 parts of the base compound prepared in Example 1, according to the formulation shown in Table 2, with:

an alkenyloxy silane compound as the component (c) which was vinyl tri(isopropenyloxy) silane, methyl tri(isopropenyloxy) silane or phenyl tri(isopropenyloxy) silane, referred to as VPS, MPS and PPS, respectively, in an amount indicated in the table;

3-(1,1,3,3-tetramethylguanidino)propyl trimethoxy silane as the component (d) in an amount of 0.5 part excepting Comparative Example 2 in which this silane compound was omitted;

dibutyltin dimethoxide as the component (e) in an amount of 0.4 part;

methyl alcohol as the optional component (f) in an amount indicated in the table with omission in some formulations; and an alkoxysilane compound as the optional component (g) which was methyl trimethoxy silane or vinyl trimethoxy silane, referred to as MMS and VMS, respectively, in an amount indicated in the table.

The blending work in Comparative Example 3 could not be completed due to the remarkable viscosity increase of the mixture under blending. Each of the other seven compositions prepared in this manner as well as the same compositions after storage in a hermetically sealed condition for 7 days at 70° C. and for 6 months at 23° C. was shaped and cured in the same manner as in Example 1 to give a cured silicone rubber sheet, of which the mechanical properties were measured together with the time taken to give a tack-free condition of the surface. The results are shown in Table 2. The line just below the formulation in Table 2 gives the molar ratio of the alkenyloxy silane compound, i.e. component (c), to the overall amount of the silanolic hydroxy groups (Si—OH) and water (H$_2$O) in each of the formulations. The composition of Comparative Example 1 after the storage tests could no longer give a cured rubber sheet having mechanical properties suitable for measurement.

mechanical properties were measured together with the time taken to give the tack-free condition of the surface. The results are shown in Table 3.

TABLE 2

|  |  | Example |  |  |  |  | Comparative Example |  |  |
|---|---|---|---|---|---|---|---|---|---|
|  |  | 2 | 3 | 4 | 5 | 6 | 1 | 2 | 3 |
| Formulation | Component (c), parts | VPS 3.0 | MPS 2.5 | PPS 3.0 | VPS 2.5 | MPS 3.0 | — | VPS 2.5 | VPS 1.5 |
|  | Component (f), parts | 1.0 | 0.8 | 1.0 | — | 1.0 | — | — | — |
|  | Component (g), parts | MMS 5.0 | MMS 5.0 | MMS 5.0 | MMS 5.0 | VMS 5.0 | VMS 7.0 | VMS 5.0 | MMS 5.0 |
| Component (c): (SiOH + H$_2$O), by moles |  | 1.30 | 1.15 | 1.07 | 1.09 | 1.38 | 0 | 1.09 | 0.65 |
| As prepared | Tack-free time, minutes | 6 | — | 9 | 6 | 6 | 10 | 10 | — |
|  | Hardness, JIS | 24 | 24 | 25 | 26 | 25 | 19 | 20 | — |
|  | Ultimate elongation, % | 400 | 390 | 420 | 390 | 400 | 280 | 300 | — |
|  | Tensile strength, kg/cm$^2$ | 15 | 14 | 13 | 16 | 15 | 10 | 11 | — |
| After storage for 7 days at 70° C. | Tack-free time, minutes | 5 | 7 | 8 | 5 | 6 | — | 60 | — |
|  | Hardness, JIS | 26 | 25 | 26 | 28 | 26 | — | 10 | — |
|  | Ultimate elongation, % | 410 | 400 | 430 | 400 | 400 | — | 150 | — |
|  | Tensile strength, kg/cm$^2$ | 17 | 15 | 15 | 18 | 15 | — | 7 | — |
| After storage for 6 months at 23° C. | Tack-free time, minutes | 6 | 7 | 9 | 6 | 6 | — | 60 | — |
|  | Hardness, JIS | 25 | 25 | 25 | 27 | 25 | — | 10 | — |
|  | Ultimate elongation, % | 400 | 400 | 415 | 400 | 410 | — | 160 | — |
|  | Tensile strength, kg/cm$^2$ | 16 | 15 | 14 | 16 | 16 | — | 8 | — |

EXAMPLES 7 to 9 AND COMPARATIVE EXAMPLES 4 AND 5

A base compound was prepared by uniformly blending 88 parts of a dimethylpolysiloxane having a viscosity of 20,000 centipoise and terminated at both molecular chain ends each with a methyl dimethoxy silyl group and the same amounts of the same two kinds of the silica fillers as used in the base compound in Example 1. The base compound prepared here contained 0.0068 mole/100 g of water.

Five RTV compositions were prepared each by uniformly blending 100 parts of the base compound, according to the formulation shown in Table 3, with:

vinyl tri(isopropenyloxy) silane as the component (c) in an amount indicated in the table;

3-(1,1,3,3-tetramethylguanidino)propyl trimethoxy silane as the component (d) in an amount of 0.5 part;

dibutyltin dimethoxide as the component (e) in an amount of 0.4 part;

methyl alcohol as the optional component (f) in an amount indicated in the table; and methyl trimethoxy silane as the optional component (g) in an amount indicated in the table.

The blending work in Comparative Example 4 could not be completed due to the remarkable viscosity increase of the mixture under blending. Each of the other four compositions prepared in this manner as well as the same compositions after storage in a hermetically sealed condition for 7 days at 70° C. and for 6 months at 23° C. was shaped and cured in the same manner as in Example 1 to give a cured silicone rubber sheet, of which the

TABLE 3

|  |  | Example |  |  | Comparative Example |  |
|---|---|---|---|---|---|---|
|  |  | 7 | 8 | 9 | 4 | 5 |
| Formulation | Component (c), parts | 1.8 | 2.5 | 1.8 | 1.0 | — |
|  | Component (f), parts | 0.8 | 1.5 | — | 0.3 | — |
|  | Component (g), parts | 5.0 | 5.0 | 5.0 | 5.0 | 7.0 |
| As prepared | Tack-free time, minutes | 5 | 6 | 5 | — | 1.5 |
|  | Hardness, JIS | 25 | 26 | 25 | — | 22 |
|  | Ultimate elongation, % | 410 | 400 | 410 | — | 430 |
|  | Tensile strength, kg/cm$^2$ | 16 | 15 | 16 | — | 16 |
| After storage for 7 days at 70° C. | Tack-free time, minutes | 5 | 6 | 6 | — | 120 |
|  | Hardness, JIS | 26 | 26 | 26 | — | 11 |
|  | Ultimate elongation, % | 420 | 410 | 420 | — | 180 |
|  | Tensile strength, kg/cm$^2$ | 17 | 16 | 16 | — | 8 |
| After storage for 6 months at 23° C. | Tack-free time, minutes | 5 | 6 | 6 | — | 90 |
|  | Hardness, JIS | 25 | 26 | 26 | — | 13 |
|  | Ultimate elongation, % | 410 | 410 | 420 | — | 220 |
|  | Tensile strength, kg/cm$^2$ | 17 | 17 | 16 | — | 10 |

What is claimed is:

1. A room temperature-curable organopolysiloxane composition which comprises:

(a) 100 parts by weight of a diorganopolysiloxane terminated at both molecular chain ends each with a silyl group having a silanolic hydroxy group or two alkoxy groups;
(b) from 1 to 400 parts by weight of a filler;
(c) an alkenyloxy-containing organosilane compound represented by the general formula $$R^1{}_n SiX_{4-n},$$

in which $R^1$ is a monovalent halogen-substituted or unsubstituted hydrocarbon group selected from the class consisting of methyl, ethyl, propyl, vinyl, phenyl and 3,3,3-trifluoropropyl groups, X is an alkenyloxy group represented by the general formula $$-O-C(=CH-R^2)(-CH_2-R^2),$$

each $R^2$ being a hydrogen atom or an alkyl group selected from the class consisting of methyl, ethyl and propyl groups, and n is zero or 1, or a partial hydrolysis product thereof in an at least equimolar amount to the overall content of the silanolic hydroxy groups in the component (a) and the water contained in the component (b);
(d) from 0.01 to 10 parts by weight of an organosilane or organopolysiloxane compound having, in a molecule, at least one guanidino group represented by the general formula $$(R^3{}_2N)_2C=N-,$$

in which $R^3$ is a hydrogen atom or a monovalent hydrocarbon group;
(e) an organic tin compound in an amount in the range from 0.01 to 10% by weight based on the total amount of the components (a) to (d);
(f) an alcohol represented by the general formula $R^4OH$, in which $R^4$ is a monovalent hydrocarbon group, in an amount not exceeding 10% by weight based on the total amount of the components (a) to (d); and
(g) an alkoxysilane compound represented by the general formula $R^5{}_m Si(OR^6)_{4-m}$, in which $R^5$ is a monovalent hydrocarbon group, $R^6$ is an alkyl group or an alkoxy-substituted alkyl group and m is zero or 1, or a partial hydrolysis product thereof in an amount not exceeding 50% by weight based on the total amount of the components (a) to (d).

2. The room temperature-curable organopolysiloxane composition as claimed in claim 1 wherein the alkenyloxy-containing organosilane compound as the component (c) is selected from the class consisting of methyl tri(isopropenyloxy) silane, vinyl tri(isopropenyloxy) silane and phenyl tri(isopropenyloxy) silane.

3. The room temperature-curable organopolysiloxane composition as claimed in claim 1 wherein the organosilane compound having, in a molecule, at least one guanidino group as the component (d) is 3-(1,1,3,3-tetramethylguanidino)propyl trimethoxy silane.

* * * * *